United States Patent [19]

Adams

[11] 4,180,144
[45] Dec. 25, 1979

[54] VALVE STEM CLEANER AND LUBRICATOR

[76] Inventor: Harold R. Adams, St. Francisville, Ill. 62460

[21] Appl. No.: 882,557

[22] Filed: Mar. 2, 1978

[51] Int. Cl.$^2$ ............................................. F16N 11/00
[52] U.S. Cl. ..................................... 184/1 R; 10/1 B; 15/256.5
[58] Field of Search ................... 15/256.5, 160, 210 B, 15/104.03, 67; 10/1 R, 1 B; 82/27, 34; 74/459, 424.8; 184/102, 1 R

[56] References Cited

U.S. PATENT DOCUMENTS

| | | | |
|---|---|---|---|
| 957,301 | 5/1910 | Buchheit | 15/67 |
| 975,066 | 11/1910 | Penman | 15/67 |
| 1,130,418 | 3/1915 | Martinelli | 15/67 |
| 1,144,734 | 6/1915 | Shaw et al. | 15/67 |
| 2,305,079 | 12/1942 | Heldenbrand | 10/1 B |
| 2,580,170 | 12/1951 | Grimmer | 15/256.5 X |
| 2,629,121 | 2/1953 | Petre | 15/104.03 |
| 2,951,557 | 9/1960 | Jung | 184/102 |
| 3,435,479 | 4/1969 | Gibson | 15/104.04 |
| 3,436,783 | 4/1969 | McCartney | 15/104.03 |
| 3,851,541 | 12/1974 | Ploss et al. | 74/459 |

FOREIGN PATENT DOCUMENTS

| | | | |
|---|---|---|---|
| 986802 | 4/1951 | France | 15/256.5 |
| 162869 | 5/1921 | United Kingdom | 15/67 |

*Primary Examiner*—David H. Brown
*Attorney, Agent, or Firm*—Glenn K. Robbins

[57] ABSTRACT

A device for cleaning and lubricating threaded valve stems. In one form the device comprises a bracket attached to a valve hand wheel comprising a circular wire brush which is adjustable to engage the threads of the valve stem at one side with provisions of dropping oil on the brush to lubricate the valve stem. In another form means are provided for supporting diametrically opposed wire brushes to engage the opposite sides of the valve stem for cleaning the threads. In still another form, a circular ring-like holder is provided with a internal wire brush and means are provided for slipping the wire brush over the end of the valve stem and clamping it to the valve bushing. Where the valve stem area to be cleaned is not easily accessible as in the interior of the valve yoke a wire brush holder comprised of split half rings with internal brushes is adapted to be fitted together around the valve stem with clamping means for holding the half rings together and fastening the holder to the valve bushing. Where the internal wire brushes are used with the circular holder a gap is provided in the periphery in order that cleaned debris may drop therethrough and be cleared.

11 Claims, 9 Drawing Figures

VALVE STEM CLEANER AND LUBRICATOR

SUMMARY OF THE INVENTION

It has long been a problem in large scale industrial processing to provide proper maintenance for the large valves used in various types of pipelines. Such pipelines for example are used in steam plants, oil wells and refineries and other process industries and handle many types and large quantities of fluids under high pressures and temperature. The valves are subjected to inclement weather and various types of corrosive activities such as chemical vapors, salt water and other types of damaging exposure factors. Thus large gate valves and other types of valves using manually operated hand wheels on threaded valve stems must be periodically maintained to insure proper maintenance and operation under all types of severe weather and other exposure conditions.

In such various types of industrial installations it has long been a problem to prevent corrosion and other types of damage to the threaded valve stems in such valves. The valve stems must be kept clear in order that proper turning of the hand wheel by an operator can be effected to open and close the valves under regular conditions as well as emergency conditions. The threaded valve stems commonly collect dirt and debris or become pitted and corroded it is the primary object of this invention to insure that such threaded valve stems are kept relatively clean and lubricated.

By means of this invention there has been provided various types of valve stem cleaning devices which can be used on various types of valve stems and in different areas of the valve such as above, a conventional bushing and inside the yoke.

Thus there has been provided for an outside screw and bushing in which the threaded valve stem rises and falls means for cleaning and lubricating the valve stem as it is rotated in its operation. The device is adapted to be removably clamped to a valve hand wheel. The clamp is in the form of a bracket that supports a circular wire brush which is engageable at one side with the threads of the valve stem. A drip feed oiler is adapted to dispense drops of oil at pre-selected intervals upon the periphery of the wire brush adjacent to the valve stem to provide lubricant to the brush as the valve stem is rotated past it. Thus in the device there has been provided means for not only cleaning the threads of the valve stem but also for providing lubrication to facilitate the threaded engagement of the valve stem with the valve mechanism and improve the operation and prevent or greatly minimize malfunction.

In another function of the invention the hand wheel is provided with bracket attached to the top with diametrically opposed wire brushes which can be connected to the ends of the clamp. The wire brushes are adjustable on the clamp which is of a U-shaped configuration with upwardly standing legs or supports with means for adjusting the wire brushes into and out of engagement with valve stem threads and also for elevating or lowering the brushes to provide for adjustment parallel to the axis of the brush. In this form the diametrically opposed brushes may be opposed to one another at the horizontal level or staggered with respect to one another in order to vary the position of the thread cleaning and provide for cleaning different areas of the thread at the same time or cleaning the same area in tandem as desired.

In still another form of the invention a circular wire brush holder is provided with internal wire bristles. Where the valve hand wheel is keyed to the end of the threaded valve stem and can be removed the holder is made circular and can be slipped over the end of the valve stem and clamped to the valve yoke. In this form the internal wire bristles clean the valve stem as the hand wheel is operated.

Where the valve stem area to be cleaned can not be reached by slipping the ring over the end of the valve stem such as in the interior of the valve yoke, split valve ring holders may be utilized. In this form the holders are in the form of half rings having internal wire bristles. Means are provided such as a spring-like clamping ring for clamping the two brush holders together. Means are also provided for attaching the holder to the bushing by set screws or other means. In this form the internal wire bristles extend around the periphery of the valve stem but are interrupted for a space of about 5 to 10 degrees in order to provide a gap for the removed rust or debris to clear the holder. This insures that the debris does not collect inside the holder and faul the valve stem.

The various types of cleaning and lubricating brushes for use with valve stem and the various types of valves as described facilitate greatly the maintenance and operation of the valve mechanism. By keeping the valve stem clean and lubricated the ease of operation is greatly improved and malfunction due to corroded valve stems and the like has been greatly minimized. The various types of brushes and lubricating devices as described can be installed in various types of valves with relatively low cost and expenditure of labor. The cleaning and lubricating devices are rugged and provide a substantial advance in the valve construction art.

The above features are objects of this invention. Further objects will appear in the detailed description which follows and will be otherwise apparent to those skilled in the art.

For the purpose of illustration of this invention there is shown in the accompanying drawings preferred embodiments thereof. It is to be understood that these drawings are for the purpose of example only and that the invention is not limited thereto.

IN THE DRAWINGS

DESCRIPTION OF THE INVENTION

Figure 1:
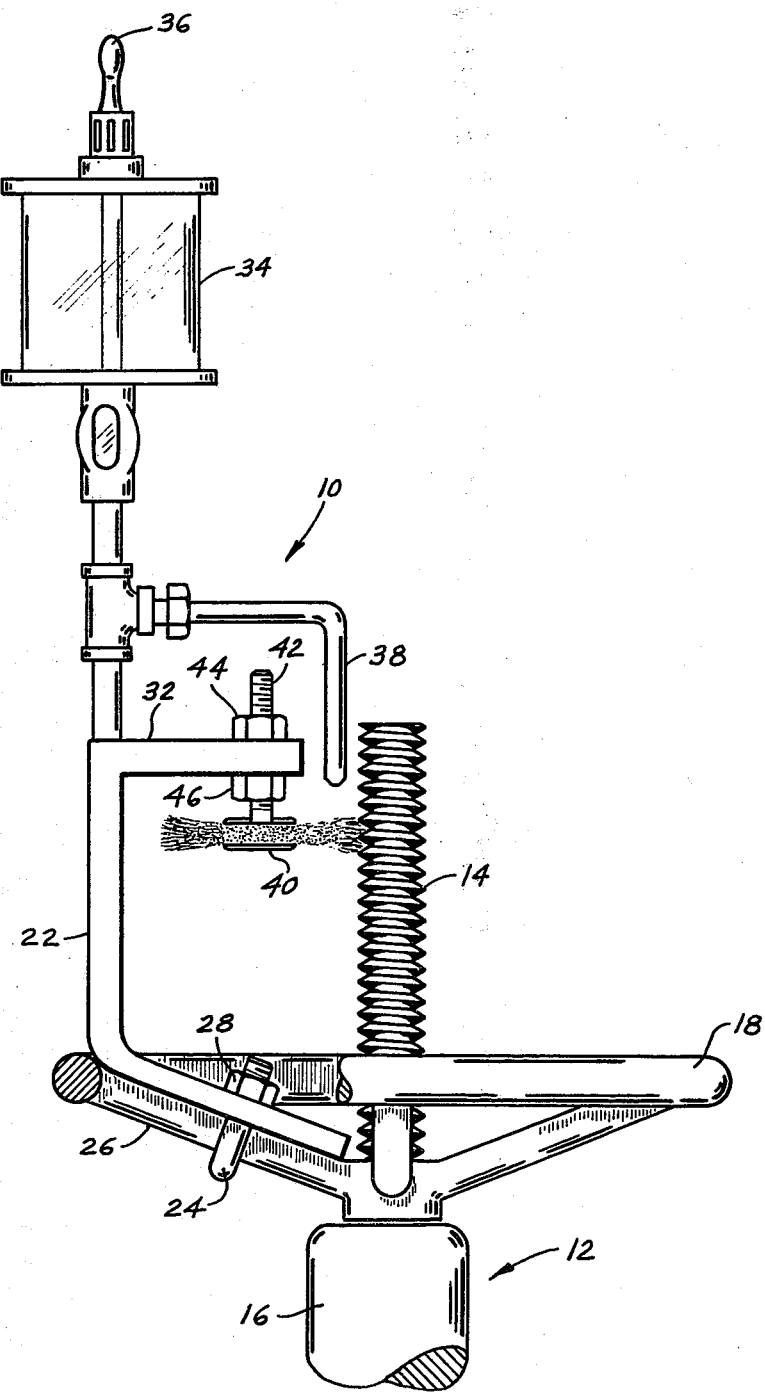
FIG. 1, is a view in elevation of the top portion of a rising stem valve having an exposed valve stem end equipped with a valve stem cleaner and lubricator device.

The valve stem cleaning and lubricating device of this invention is generally identified by the reference numeral 10 in FIG. 1. It is shown employed with the top portion of a gate valve 12 having an outside valve stem or screw 14 and a bushing 16. The treaded rising stem 14 is threadably engageable with a conventional valve wheel 18.

The cleaning and lubricating device 10 is comprised of a U-shaped bracket 22 which is clamped by a conventional U-bolt 24 to a spoke 26 of the hand wheel. Nuts 28 are provided for connecting the bracket to the U-bolt and for varying the vertical height of the clamp with respect to the hand wheel and valve stem.

The U-shaped bracket 22 has a top leg 32 which supports a drip feed oiler 34. The drip feed oiler is of conventional construction and is provided with an adjustment valve 36 at the top for varying the rate of the dispensing of droplets of oil through the outlet tube 38.

The top arm 32 also supports a circular wire brush 40. The wire brush is connected by means of a central bolt 42 and connecting nuts 44 and 46. These nuts may be backed off or advanced to further provide for vertical adjustment of the wire brush as desired.

Figure 7:
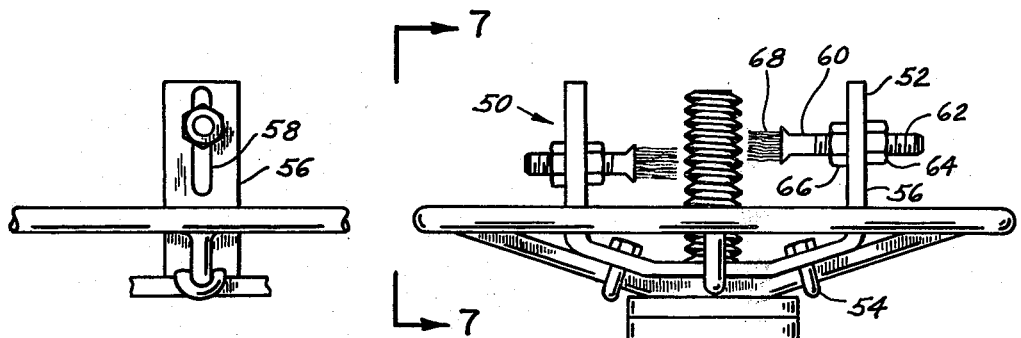
FIG. 7, is a view in side elevation taken on the line 7—7 of FIG. 6.
Figure 8:
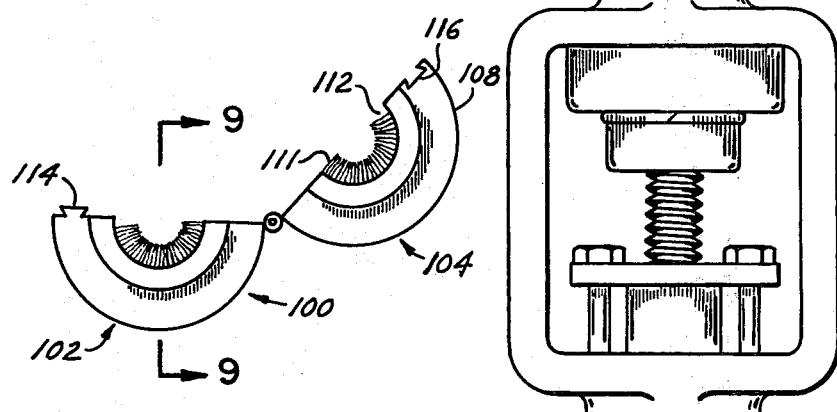
FIG. 8, is a hinged modification of the split ring brush of FIG. 4.
Figure 9:
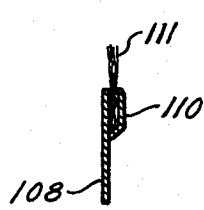
FIG. 9, is a view in section on line 9—9 of FIG. 8.
Figure 6:
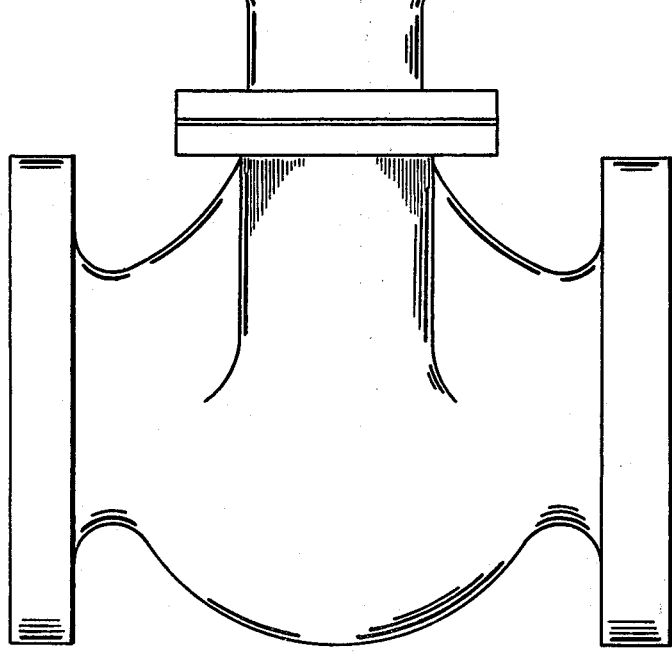
FIG. 6, is a view in front elevation of a rising stem valve equipped with diametrically opposed side brushes.

Another form of device for cleaning the threads of the valve stem by fixing a wire brush to the valve hand wheel is shown in FIGS. 6 and 7. The device of this modification is generally identified by the reference numeral 50. It is comprised of a U-shaped bracket 52 adapted to be clamped to the valve hand wheel spokes by U-bolts 54. The U-shaped bracket as shown in FIG. 7 has upstanding arms 56 provided with elongated slots 58 which receive a wire brush holder 60. The wire brush holder 60 has a shank 62 adapted to fit through the slots and is connected to the arms by nuts 64 and 66. The wire brush holders are provided with wire bristles 68 to engage the valve stem threads and clean debris therefrom.

Figures 2, 3, 4, 5:
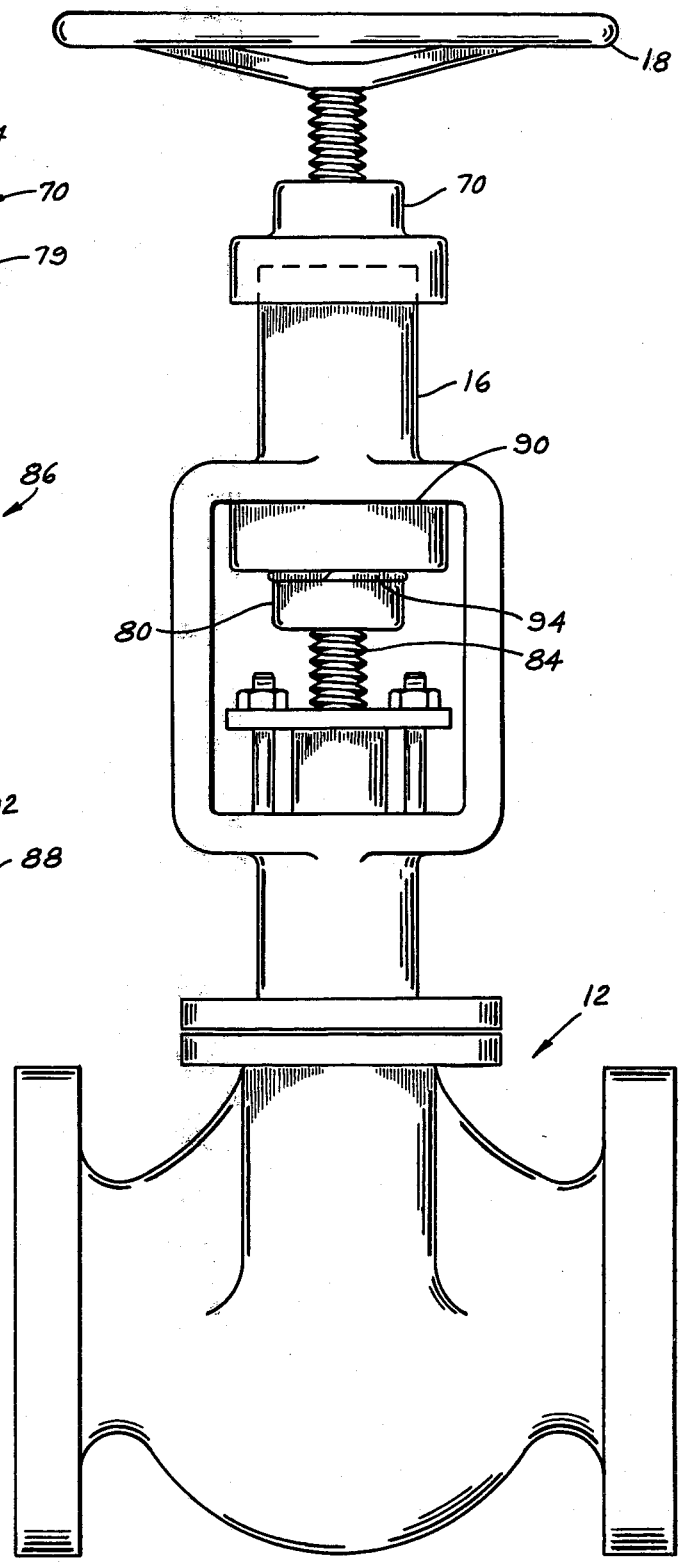
FIG. 2, is a view in front elevation of a rising stem valve having a hand wheel keyed to the end of the valve stem equipped with two types of valve stem cleaners for use where the end of the valve stem may be made accessible and inside the valve yoke where the portion of the valve stem to be cleaned is not accessible.
FIG. 3, is a view in cross section of a brush cleaner used where the end of the valve stem is accessible.
FIG. 4, is a view in side elevation of a split half ring brush cleaner element for use inside the valve yoke.
FIG. 5, is a top plan view of the split half ring brush members connected together.

Another form of wire brush for cleaning the threads of the valve stem is shown in FIGS. 2 and 3 in the form of a ring-like wire brush holder 70. This type is employed where the hand wheel 18 can be readily removed from the valve stem by removing it from the conventional key-way (not shown) holding the hand wheel to the end of the valve. When the end of the valve stem is exposed the ring-like holder can be readily fitted over the end and clamped to the top of the bushing 16.

The holder 70 is shown in FIG. 3 comprised of body 72 having a central bore 74 provided with inwardly extending wire bristles 76. An enlarged diameter opening 78 is provided at the bottom and to fit over the top of the bushing. Tapped openings 79 are provided at the sides to receive set screws or the like for clamping the holder to the top of the valve yoke.

Another form of brush holder is imployed where the portion of the valve stem to be cleaned is not readily accessible by slipping the ring-like holder 80 over the valve. Such an area is the portion of the valve stem which is in the interior valve stem portion 84 shown in FIG. 2 inside the yoke. A split ring holder comprised of two ring-like half sections 86 is employed which are adapted to be fitted against the valve stem and then connected to the underside of the top portion of the bushing. The half section 86 have an enlarged base 88 which may be provided with tapped openings for insertion of set screws to attach the holder to a boss portion 90 at the top of the valve yoke. Internal wire bristles 92 are provided which extend radially inwardly to contact the threads of the valve stem. As shown in FIG. 5 a gap of 5 or 10 degrees is provided in the periphery of the wire bristles in order that cleaned debris may fall therethrough.

The split ring brush holders 86 are simply connected together by fitting them together around the valve stem and then using a spring-like ring clamp 94 to hold the halves together. Where the top of the bushing is not provided with the boss portion bonding cement may be used to connect the holder to the yoke. Alternatively where the bushing is of steel the brush holder may be made of a magnetic material or provided with magnet means for holding the holder to the bushing.

The split ring brush is shown as a modification 100 in hinged form. It is comprised of half sections 102 and 104 connected by a hinge 106. Each section is comprises of a semi-circular top plate 108 connected to a bottom plate 110 with radially inwardly extending bristles 111 clamped in between. A gap 112 is provided in the bristles to clear debris.

The top plate has an outer diameter extending beyond the outer diameter of the bottom plate. The top plates of section 102 is provided with a dove tail extension 114 which is adapted to fit in a dove tail recess 116 to lock the two rings together. The two sections are adapted to be connected together by a slight twisting action when the sections are closed toward one another to register the dove tail extension 114 above or below the dove tail recess 116 and then fitting them together. The hinged brush may be connected to the bushing in the same fashion as the split ring brush holder 86 by cement or set screws. It will also be understood that the plates may be formed with shoulders to fit over any boss portions or the like on the valve.

USE

The cleaning and lubricating device of FIG. 1, is very simply employed with the valve. The bracket 22 is simply clamped to a spoke of the hand wheel in a position of vertical adjustment where the wire brush 40 engages the threads of the valve stem. The drip oiler may be operated and set manually or electrically operated as will be well understood in the art to dispense drops of oil at a pre-selected rate to the outer periphery of the wire brush adjacent the threaded valve stem. As the valve hand wheel is operated over a period of time the wire brush may be moved manually but it will be understood that the engagement of the threads of the valve stem with the wire brush may also move the brush itself to provide fresh surface to clean the valve threads of rust, dirt, debris and the like. The removed dust, debris or other material will clear the valve stem and fall through the hand wheel.

Where the operational and maintenance requirements are such that no lubrication is deemed necessary the wire brush system of FIGS. 6 and 7 designated by the reference numeral 60 may be employed. In this modification the clamp 52 is simply connected at the top of the valve hand wheel and the wire brushes 60 are adjusted in such fashion that the bristles 68 engage the threads of the valve stem where it is desired that the same threads of the valve stem be cleaned by tandem action of the wire brushes the wire brushes may be staggered one above the other so that as the threaded valve stem is rotated the threads pass the wire brushes at one side and then the brush at the diametrically opposite side of the valve hand wheel.

The ring-like valve stem brush cleaner 70 of FIGS. 2 and 3 is adapted for simple clamping to the top of the valve yoke where the valve hand wheel can be simply removed from the valve stem. Where this can be effected the ring-like holder is simply fitted over the end of the valve stem and clamped by means of set screws through the tapped openings 79 to the top of the valve. The valve hand wheel is then fastened to the top of the valve stem. As it is rotated the threaded valve stem will engage the internal bristles 76 and the threads will be cleaned.

The split ring brush holder 80 is adapted for simple installation in areas where the threaded valve stem can not be reached by slipping the circular holder 72 over the end of the valve stem. Thus the inaccessible area 84 of the valve stem of FIG. 2 can be simply provided with the split half ring members to clean the exposed area of the valve stem threads in this area. The split halves 86 are simply fitted around the valve stem and clamped together by the clamping ring. The assembled holder is then connected to the bushing either by set screws, cement bonding, magnets or other conventional holding means.

There have been provided through this invention various types of valve stem cleaning and lubricating devices adapted for use in different types of valve stem environments. The various devices are simply employed and readily installed to provide a high degree of cleaning and lubrication and provide a substantial improvement and protection for valve structures. The devices are rugged and relatively free of maintenance and can be employed over a long period of time for the protection of a threaded valve stem structure in operation.

Various changes and modifications may be made within this invention as will be readily apparent to those skilled in the art. Such changes and modifications are within the scope and teaching of this invention as defined by the claims appended hereto.

What is claimed is:

1. A device for cleaning threaded valve stems on valves having a valve housing comprising a brush, means for mounting said brush on the valve housing, said brush having bristle elements adapted to contact the threads in said valve stem, the brush being comprised of a ring-like brush holder, said holder being comprised of semi-circular members having first end portions pivotable together in order that the holder can be opened and fitted around the valve stem and means for connecting a second end of said members together in closed position.

2. The valve stem cleaning device of claim 1, in which said brush mounting comprises means for connecting the holder in fixed relation to a stationary portion of a bushing connected to the valve body.

3. The valve stem cleaning device of claim 1, in which the holder is provided with said bristle elements radial inwardly extending around the circumference of the holder.

4. The valve stem cleaning device of claim 3, in which said brush mounting means comprises means for connecting the holder in fixed relation to a stationary portion of a bushing connected to the valve body.

5. The valve stem cleaning device of claim 3, in which a gap is provided between the bristle elements to provide a slot for debris cleaned from the valve stem thread to drop and be cleared.

6. The valve stem cleaning device of claim 5, in which said brush mounting means comprises means for connecting the holder in fixed relation to a stationary portion of a bushing connected to the valve body.

7. A device for cleaning threaded valve stems on valves having a valve housing comprising a brush, means for mounting said brush on the valve housing said brush having bristle elements adapted to contact the threads in said valve stem, the brush being comprised of a brush holder having horizontally extending bristles adapted to contact a side of the threaded valve stem and said brush mounting means comprises means for moving said holder to advance fresh bristles into contact with said valve stem by radially advancing and retracting said brush into and out of engagement with said valve stem.

8. The valve stem cleaning device of claim 7, in which means are provided for adjusting said brush parallel to the axis of the valve stem.

9. The valve stem cleaning device of claim 7, in which said brush mounting means is comprised of a pair of diametrically opposed brush holders having said brush means engageable with opposite sides of the valve stem.

10. The valve stem cleaning device of claim 7, in which means are provided for dispening oil on the portion of the brush adapted to contact the valve stem.

11. The valve stem cleaning device of claim 10, in which said oil dispensing oiler is a drip oiler adapted to dispense oil at pre-selected intervals.

* * * * *